(12) United States Patent
Sanguineti et al.

(10) Patent No.: US 12,116,477 B2
(45) Date of Patent: Oct. 15, 2024

(54) FLUORINE-CONTAINING THERMOPLASTIC ELASTOMER COMPOSITION

(71) Applicant: SOLVAY SPECIALTY POLYMERS ITALY S.P.A., Bollate (IT)

(72) Inventors: Aldo Sanguineti, Milan (IT); Mattia Bassi, Milan (IT); Eliana Ieva, Alessandria (IT); Marco Mirenda, Rho (IT); Matteo Fantoni, Vanzaghello (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 152 days.

(21) Appl. No.: 17/422,477

(22) PCT Filed: Mar. 4, 2020

(86) PCT No.: PCT/EP2020/055607
§ 371 (c)(1),
(2) Date: Jul. 13, 2021

(87) PCT Pub. No.: WO2020/178303
PCT Pub. Date: Sep. 10, 2020

(65) Prior Publication Data
US 2022/0089853 A1 Mar. 24, 2022

(30) Foreign Application Priority Data
Mar. 7, 2019 (EP) ..................... 19161280

(51) Int. Cl.
*C08L 27/18* (2006.01)
*C08L 27/16* (2006.01)
*C08L 27/20* (2006.01)

(52) U.S. Cl.
CPC ............ *C08L 27/18* (2013.01); *C08L 27/16* (2013.01); *C08L 27/20* (2013.01); *C08L 2203/18* (2013.01); *C08L 2203/30* (2013.01); *C08L 2205/22* (2013.01); *C08L 2207/04* (2013.01)

(58) Field of Classification Search
CPC ...................................................... C08L 27/18
See application file for complete search history.

(56) References Cited

U.S. PATENT DOCUMENTS

| | | | |
|---|---|---|---|
| 4,281,092 A | 7/1981 | Breazeale | |
| 5,006,594 A * | 4/1991 | Rees | C08L 27/12 525/196 |
| 5,447,993 A | 9/1995 | Logothetis | |
| 5,789,489 A | 8/1998 | Coughlin et al. | |
| 8,997,797 B2 | 4/2015 | Kitahara et al. | |
| 2007/0167574 A1 | 7/2007 | Park | |
| 2007/0190284 A1 | 8/2007 | Park | |
| 2009/0203846 A1 | 8/2009 | Park et al. | |
| 2010/0247913 A1 * | 9/2010 | Nakagawa | C08J 3/24 525/263 |
| 2020/0377631 A1 * | 12/2020 | Bassi | C08J 3/05 |

FOREIGN PATENT DOCUMENTS

| | | |
|---|---|---|
| EP | 168020 A2 | 1/1986 |
| EP | 661304 A1 | 7/1995 |
| EP | 860436 A1 | 8/1998 |
| WO | 1997005122 A1 | 2/1997 |
| WO | 2018189090 A1 | 10/2018 |
| WO | 2018189091 A1 | 10/2018 |
| WO | 2018189092 A1 | 10/2018 |

OTHER PUBLICATIONS

EP 168,020 (Year: 1986).*

* cited by examiner

*Primary Examiner* — Irina Krylova
(74) *Attorney, Agent, or Firm* — Osha Bergman Watanabe & Burton LLP

(57) ABSTRACT

The present invention relates to a fluorine-containing thermoplastic elastomer composition comprising a continuous thermoplastic fluorocarbon polymer phase and a dispersed fluorine-containing elastomer phase which are useful, for example, in automotive fuel lines.

10 Claims, No Drawings

FLUORINE-CONTAINING THERMOPLASTIC ELASTOMER COMPOSITION

CROSS-REFERENCE TO RELATED APPLICATIONS

This application is a U.S. national stage entry under 35 U.S.C. § 371 of International Application No. PCT/EP2020/055607 filed Mar. 4, 2020, which claims priority to European patent application No. 19161280.3, filed on Mar. 7, 2019. The entire contents of these applications are explicitly incorporated herein by this reference.

TECHNICAL FIELD

The present invention relates to a fluorine-containing thermoplastic elastomer composition comprising a continuous thermoplastic fluorocarbon polymer phase and a dispersed fluorine-containing elastomer phase which are useful, for example, in automotive fuel lines.

BACKGROUND ART

Pipes made of fluoropolymers having both high mechanical resistance and high chemical resistance, while exhibiting low permeability at high temperatures, are known in the art.

For instance, U.S. Pat. No. 8,997,797 (DAIKIN INDUSTRIES, LTD.) Jul. 4, 2015 discloses fluoropolymers having a high crystallinity and a high storage modulus at 170° C. which are suitable for the manufacture of riser pipes, said fluoropolymers consisting of copolymerized units derived from tetrafluoroethylene (TFE), vinylidene fluoride (VDF) and an ethylenically unsaturated monomer other than tetrafluoroethylene and vinylidene fluoride. Among these terpolymers, mention is specifically made of (j) terpolymers of TFE and VDF with 0.1 to 5.0% moles of recurring units derived from a (per)fluoroalkyl ethylene monomer (e.g. $CH_2=CH-C_4F_9$; $CH_2=CH-C_6F_{13}$) and (jj) terpolymers of TFE and VDF with 0.1 to 0.8% moles of recurring units derived from a (per)(fluoro)alkyl vinyl ether of formula $CF_2=CF-OR_f^1$, with $R_f^1$ being a $C_{1-3}$ alkyl group of a $C_{1-3}$ fluoroalkyl group.

Nevertheless, fluoropolymers with high values of the storage modulus and/or high values of the tensile modulus at high temperatures disadvantageously have poor thermal stress cracking resistance, and are rather stiff, with very low elongation at break.

Two-phase compositions comprising a continuous phase thermoplastic material and a disperse phase elastomer, produced by dynamically vulcanizing the elastomer while the dispersed phase elastomer is mixed under shear in the continuous thermoplastic material kept in the molten state are well known in the art and often referred to as thermoplastic vulcanizates (TPV).

These materials are particularly advantageous in that they derive their rubber-like properties from the dispersed phase, so that they can be notably used in all rubber-typical fields of use (sealing articles, including seals and gaskets, pipes, hoses, flat sheets, and the like), while being processable as thermoplastics, including possibility of reforming scraps, flashes or defective parts.

Because of advantageous properties of fluorine-containing materials, TPV including both thermoplastic fluorinated polymer continuous phase and fluorine-containing elastomer dispersed phase have attracted great deal of attention for providing high level of chemical resistance with the advantages of thermoplastic processability.

For instance, patent document EP 168020 A (DUPONT DE NEMOURS) Jan. 15, 1986 discloses fluorinated thermoplastic elastomer containing two phases, namely a crystalline thermoplastic phase and a dispersed fluorinated amorphous elastomeric phase, obtained by blending the components in the molten state and then dynamically curing the same, e.g. in an extruder through addition of a curing agent (ionic curing or peroxide curing). Thermoplastic polymer can be notably polyvinyliden fluoride; example 8 pertains to the preparation in a Brabender of a TPV comprising 70% wt vinylidene fluoride (VDF)/hexafluoropropylene (HFP) copolymer and 30% wt of polyvinylidene fluoride by ionic curing.

Still, patent document U.S. Pat. No. 5,006,594 (DUPONT DE NEMOURS) Apr. 9, 1991 discloses new blends of fluorinated thermoplastic elastomers containing a two-phase composition including a continuous phase of a melt processable resin and a dispersed phase of an amorphous crosslinked fluoroelastomer. Homopolymers of vinylidene fluoride and copolymers of vinylidene fluoride in which the vinylidene fluoride is the greatly predominant polymerized monomer, are mentioned as possible thermoplastic fluororesin.

In the automotive industry there are multiple different requirements for the automotive elements, in particular for lines in the fuel systems.

Increased concern with evaporative fuel standards has led to the need for fuel system components that have improved barrier properties. This helps reduce the permeation of fuel vapors through automotive elements such as fuel filler lines, fuel hoses, fuel supply lines, fuel tanks, and other elements of an automobile fuel system. Multi-layer tubing and other articles containing a fluorinated layer have been used in such automotive elements to provide a chemically resistant permeation barrier.

In addition, there are thermal and mechanical requirements that should be maintained over a long lifetime. Included in the mechanical requirements are sufficient flexibility and impact strength for both fabrication and safety. In addition, liquid lines also meet the requirement that essentially no materials used in forming the fuel line contaminate the fuel, which could lead to problems such as clogged fuel injectors. Thus, the lines must be chemically resistant to the liquids to be carried by the lines.

There is thus the need for thermoplastic compositions that can be used to form automotive fuel lines that exhibit excellent barrier properties as well as good mechanical characteristics, including both good impact resistance and good flexibility, so as to form fuel lines that can be quickly and easily installed and that can exhibit desirable characteristics over a long working life.

SUMMARY OF INVENTION

The Applicant has now found that certain compositions of fluorine-containing thermoplastics and elastomers are particularly effective in ensuring improved flexibility and very low permeability to fuel fluids.

It is thus hereby provided a thermoplastic elastomer composition [composition (C)] comprising a continuous thermoplastic fluoropolymer phase and a dispersed fluoroelastomer phase, said composition comprising:

a. at least one thermoplastic fluoropolymer [polymer (F)], said polymer (F) comprising:

from 60% to 80% by moles, preferably from 65% to 78% by moles of recurring units derived from tetrafluoroethylene (TFE), from 15% to 35% by moles, preferably from 20% to 30% by moles of recurring units derived from vinylidene fluoride (VDF), and from 1% to 5% by moles, preferably from 1.5% to 3.5% by moles of recurring units derived from at least one perfluoroalkylvinylether (PAVE) of formula (I):

$$CF_2=CF-O-R_f \qquad (I)$$

wherein $R_f$ is a $C_1$-$C_6$ alkyl group or a $C_1$-$C_6$ (per)fluoroalkyl group, wherein the molar amounts of said recurring units are relative to the total moles of recurring units in said polymer (F); and b. at least one (per)fluoroelastomer [elastomer (A)].

The applicant has found that when the polymer (F) as above detailed comprises defined amount of recurring units from at least one perfluoroalkylvinylether (PAVE) of formula (I), the composition (C) possesses advantageously a good compromise between low permeability to fuel fluids and flexibility.

In another aspect, the present invention provides a process for the preparation of the composition (C) as above detailed, said process comprising melt mixing the components of composition (C).

The Applicant has also found that if the dispersed fluoroelastomer phase in composition (C) is vulcanized, the risk of leaching action occasioned by contact of such composition with fuel flow is reduced.

In another aspect, the present invention thus provides a thermoplastic elastomer vulcanizate composition [vulcanizate (V)], comprising a continuous thermoplastic fluoropolymer phase and a dispersed vulcanized fluoroelastomer phase, said composition comprising:

a. at least one thermoplastic fluoropolymer [polymer (F)], said polymer (F) comprising:

from 60% to 80% by moles, preferably from 65% to 78% by moles of recurring units derived from tetrafluoroethylene (TFE), from 15% to 35% by moles, preferably from 20% to 30% by moles of recurring units derived from vinylidene fluoride (VDF), and from 1% to 5% by moles, preferably from 1.5% to 3.5% by moles of recurring units derived from at least one perfluoroalkylvinylether (PAVE) of formula (I):

$$CF_2=CF-O-R_f \qquad (I)$$

wherein $R_f$ is a $C_1$-$C_6$ alkyl group or a $C_1$-$C_6$ (per)fluoroalkyl group, wherein the molar amounts of said recurring units are relative to the total moles of recurring units in said polymer (F); and b. at least one (per)fluoroelastomer [elastomer (A)].

The invention further pertains to a method for manufacturing the vulcanizate (V), as above detailed, comprising melt mixing and dynamic curing at least one polymer (F) and at least one elastomer (A) in the presence of at least one curing system (CS) for the elastomer (A).

The present invention further provides articles comprising the composition (C) or the vulcanizate (V) of the present invention.

DESCRIPTION OF EMBODIMENTS

The perfluoroalkylvinylether (PAVE) of formula (I) is typically selected from the group consisting of perfluoromethylvinylether (PMVE) of formula $CF_2=CF-O-CF_3$, perfluoroethylvinylether (PEVE) of formula $CF_2=CF-O-CF_2-CF_3$ and perfluoropropylvinylether (PPVE) of formula $CF_2=CF-O-CF_2-CF_2-CF_3$.

As mentioned above, polymer (F) is a thermoplastic polymer, that is to say a polymer which softens on heating and hardens on cooling at room temperature, which at room temperature exists below its glass transition temperature if amorphous or below its melting point if semi-crystalline.

It is nevertheless generally preferred for the polymer (F) to be semi-crystalline, that is to say to have a definite melting point; preferred polymers (F) are those possessing a heat of fusion of at least 5 J/g, preferably of at least 10 J/g, more preferably at least 20 J/g.

Heat of fusion is generally determined by DSC according to ASTM D3418 standard.

The polymer (F) of the invention is advantageously melt-processable. The term "melt-processable" is hereby intended to denote a fluoropolymer which can be processed by conventional melt-processing techniques.

The polymer (F) of the invention typically has a melting point ($T_m$) comprised between 170° C. and 300° C., preferably between 200° C. and 280° C.

The polymer (F) is typically obtainable by a process carried out either by suspension polymerization or by emulsion polymerization, typically in an aqueous polymerization medium.

The polymer (F) of the invention is preferably obtainable by emulsion polymerization in an aqueous polymerization medium, according to the procedures described, for example, in WO 2018/189090, in WO 2018/189091 and WO 2018/189092.

The polymer (F) of the invention is typically in the form of powder, recovered from an aqueous latex obtainable by emulsion polymerization in an aqueous polymerization medium as above detailed.

For the purposes of this invention, the term "(per)fluoroelastomer" [elastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Non limitative examples of suitable (per)fluorinated monomers are notably:

$C_2$-$C_8$ fluoro- and/or perfluoroolefins, such as tetrafluoroethylene (TFE), hexafluoropropene (HFP), pentafluoropropylene, and hexafluoroisobutylene;

$C_2$-$C_8$ hydrogenated monofluoroolefins, such as vinyl fluoride, 1,2-difluoroethylene, vinylidene fluoride (VDF) and trifluoroethylene (TrFE);

(per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins, like chlorotrifluoroethylene (CTFE);

fluoroalkylvinylethers complying with formula $CF_2=CFOR_{f1}$ in which $R_{f1}$ is a $C_1$-$C_6$ fluoro- or perfluoroalkyl, e.g. —$CF_3$, —$C_2F_5$, —$C_3F_7$;

hydrofluoroalkylvinylethers complying with formula $CH_2=CFOR_{f1}$ in which $R_{f1}$ is a $C_1$-$C_6$ fluoro- or perfluoroalkyl, e.g. —$CF_3$, —$C_2F_5$, —$C_3F_7$;

fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;

functional fluoro-alkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

fluorodioxoles, of formula:

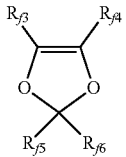

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Examples of hydrogenated monomers are notably hydrogenated alpha-olefins, including ethylene, propylene, 1-butene, diene monomers, styrene monomers, alpha-olefins being typically used.

(Per)fluoroelastomers (A) are in general amorphous products or products having a low degree of crystallinity (crystalline phase less than 20% by volume) and a glass transition temperature ($T_g$) below room temperature. In most cases, the (per)fluoroelastomer has advantageously a $T_g$ below 10° C., preferably below 5° C., more preferably 0° C.

The (per)fluoroelastomer (A) is preferably selected among:

(1) VDF-based copolymers, in which VDF is copolymerized with at least one comonomer selected from the group consisting of the followings classes, with the provision that such comonomer is different from VDF:
  (a1) $C_2$-$C_8$ perfluoroolefins, such as tetrafluoroethylene (TFE), hexafluoropropylene (HFP), hexafluoroisobutylene;
  (b1) hydrogen-containing $C_2$-$C_8$ olefins, such as $C_2$-$C_8$ non-fluorinated olefins (Ol); $C_2$-$C_8$ partially fluorinated olefins, vinyl fluoride (VF), trifluoroethylene (TrFE), perfluoroalkyl ethylenes of formula $CH_2=CH—R_f$, wherein $R_f$ is a $C_1$-$C_6$ perfluoroalkyl group;
  (c1) $C_2$-$C_8$ chloro and/or bromo and/or iodo-fluoroolefins such as chlorotrifluoroethylene (CTFE);
  (d1) (per)fluoroalkylvinylethers of formula $CF_2=CFOR_f$, wherein $R_f$ is a $C_1$-$C_6$ (per)fluoroalkyl group; preferably perfluoroalkylvinylethers (PAVE) of above formula wherein $R_f$ is $C_1$-$C_6$ perfluoroalkyl group, e.g. $CF_3$, $C_2F_5$, $C_3F_7$;
  (e1) (per)fluoro-oxy-alkylvinylethers of formula $CF_2=CFOX$, wherein X is a $C_1$-$C_{12}$ ((per)fluoro)-oxyalkyl comprising catenary oxygen atoms, e.g. the perfluoro-2-propoxypropyl group;
  (f1) (per)fluorodioxoles having formula:

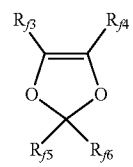

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;

(g1) (per)fluoro-methoxy-vinylethers (MOVE, hereinafter) having formula:

$$CFX^2=CX^2OCF_2OR''_f$$

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X^2$=F, H; preferably $X^2$ is F and $R''_f$ is —$CF_2CF_3$ (MOVE1); —$CF_2CF_2OCF_3$ (MOVE2); or —$CF_3$ (MOVE3);
  (h1) $C_2$-$C_8$ non-fluorinated olefins (Ol), for example ethylene and propylene; and (2) TFE-based copolymers, in which TFE is copolymerized with at least one comonomer selected from the group consisting of the classes (a1), (c1), (d1), (e1), (g1), (h1), and class (i2) below, with the provision that such comonomer is different from TFE:
  (i2) perfluorovinyl ethers containing cyanide groups, such as notably those described in patents U.S. Pat. Nos. 4,281,092, 5,447,993 and 5,789,489.

Most preferred (per)fluoroelastomers (A) are those having following compositions (in mol %):
  (i) vinylidene fluoride (VDF) 35-85%, hexafluoropropene (HFP) 10-45%, tetrafluoroethylene (TFE) 0-30%, perfluoroalkyl vinyl ethers (PAVE) 0-15%;
  (ii) vinylidene fluoride (VDF) 50-80%, perfluoroalkyl vinyl ethers (PAVE) 5-50%, tetrafluoroethylene (TFE) 0-20%;
  (iii) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30%;
  (iv) tetrafluoroethylene (TFE) 50-80%, perfluoroalkyl vinyl ethers (PAVE) 20-50%;
  (v) tetrafluoroethylene (TFE) 45-65%, $C_2$-$C_8$ non-fluorinated olefins (Ol) 20-55%, vinylidene fluoride 0-30%;
  (vi) tetrafluoroethylene (TFE) 32-60% mol %, $C_2$-$C_8$ non-fluorinated olefins (Ol) 10-40%, perfluoroalkyl vinyl ethers (PAVE) 20-40%, fluorovinyl ethers (MOVE) 0-30%;
  (vii) tetrafluoroethylene (TFE) 33-75%, perfluoroalkyl vinyl ethers (PAVE) 15-45%, vinylidene fluoride (VDF) 5-30%, hexafluoropropene HFP 0-30%;

(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%;

(ix) tetrafluoroethylene (TFE) 20-70%, fluorovinyl ethers (MOVE) 30-80%, perfluoroalkyl vinyl ethers (PAVE) 0-50%.

Optionally, (per)fluoroelastomer (A) of the present invention also comprises recurring units derived from a bis-olefin [bis-olefin (OF)] having general formula:

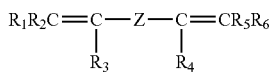

wherein $R_1$, $R_2$, $R_3$, $R_4$, $R_5$ and $R_6$, equal to or different from each other, are H, halogen, a group $R_{Alk}$ or $OR_{Alk}$, wherein $R_{Alk}$ is a branched or straight chain alkyl radical which can be partially, substantially or completely fluorinated or chlorinated; Z is a linear or branched $C_1$-$C_{18}$ alkylene or cycloalkylene radical, optionally containing oxygen atoms, preferably at least partially fluorinated, or a (per)fluoropolyoxyalkylene radical, e.g. as described in EP 661304 A (AUSIMONT SPA) Jul. 5, 1995.

The bis-olefin (OF) is preferably selected from the group consisting of those complying with formulae (OF-1), (OF-2) and (OF-3):

(OF-1)

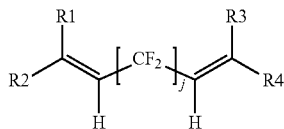

wherein j is an integer between 2 and 10, preferably between 4 and 8, and R1, R2, R3, R4, equal or different from each other, are H, F or $C_{1-5}$ alkyl or (per)fluoroalkyl group;

(OF-2)

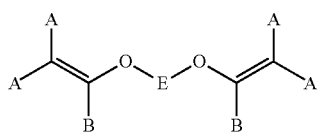

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF-O-(CF_2)_5-O-CF=CF_2$.

(OF-3)

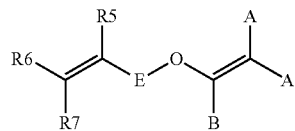

wherein E, A and B have the same meaning as above defined; R5, R6, R7, equal or different from each other, are H, F or $C_{1-5}$ alkyl or (per)fluoroalkyl group.

The weight ratio between polymer (F) and elastomer (A) in composition (C) is not particularly critical, provided that it is selected by routine experiments so as to deliver a continuous thermoplastic fluoropolymer phase and a dispersed fluoroelastomer phase in the composition (C).

Generally the weight ratio polymer (F)/elastomer (A) will be comprised between 10/90 wt/wt to 70/30 wt/wt, preferably 20/80 to 50/50 wt/wt. The skilled in the art will select most appropriate weight ratio in view of target final properties of the composition (C).

Still, the composition (C) may comprise additional optional ingredients, such as extender oils, synthetic processing oils, stabilizers, at least one processing aid, fillers, pigments, adhesives, tackifiers, and waxes. Such additional ingredients might be blended with the components of composition (C) during the melt mixing, or can be later compounded into the composition (C) after completion of melt mixing.

Particularly suitable processing aids are polyolefinic process lubricants.

The polyolefinic process lubricant can notably be selected from the group consisting of polyethylene, polypropylene and polybutylene. Preferably, the polyolefinic process lubricant is polyethylene.

The polyolefinic process lubricant can be present in the composition (C) of the invention in an amount of at most 10% wt, preferably of at most 5% wt, more preferably of at most 2% wt, still more preferably of at most 1% wt, based on the weight of polymer (F).

In a further object, the present invention provides a process for preparing the composition (C) as above defined, said process comprising melt mixing the components of said composition.

Melt mixing is carried out at a temperature where all the organic components in the composition are in the molten form, thus at a temperature above the glass transition temperature or above the melting temperature of said organic components.

By "organic component" it is meant a compound that comprises carbon other than elemental carbon. Organic components in composition (C) include, notably, polymer (F), elastomer (A) and organic optional ingredients possibly included in composition (C).

In the melt mixing procedure, the polymer (F) and elastomer (A) can be melted together, brought separately to their respective melting temperature and then mixed with each other, or subsequently added to a first melted polymer.

In a preferred embodiment of the invention, the melt mixing procedure is carried out by adding the elastomer (A) to the polymer (F) in the molten form.

The blend thus formed is allowed to stir for some minutes and allowed to cool to room temperature to provide the composition (C) of the invention.

The invention further pertains to a thermoplastic elastomer vulcanizate composition [vulcanizate (V)], comprising a continuous thermoplastic fluoropolymer phase and a dispersed vulcanized fluoroelastomer phase, said composition comprising:

a. at least one thermoplastic fluoropolymer [polymer (F)], said polymer (F) comprising:
from 60% to 80% by moles, preferably from 65% to 78% by moles of recurring units derived from tetrafluoroethylene (TFE),
from 15% to 35% by moles, preferably from 20% to 30% by moles of recurring units derived from vinylidene fluoride (VDF), and
from 1% to 5% by moles, preferably from 1.5% to 3.5% by moles of recurring units derived from at least one perfluoroalkylvinylether (PAVE) of formula (I):

$$CF_2=CF-O-R_f \qquad (I)$$

wherein $R_f$ is a $C_1$-$C_6$ alkyl group or a $C_1$-$C_6$ (per)fluoroalkyl group,
wherein the molar amounts of said recurring units are relative to the total moles of recurring units in said polymer (F); and b. at least one (per)fluoroelastomer [elastomer (A)].

All the features described above for polymer (F), elastomer (A), and for optional ingredients of the composition (C), are also applicable here as preferred embodiments of the vulcanizate (V).

Vulcanizate (V) of the present invention is suitably prepared by a process comprising melt mixing the at least one polymer (F) and the at least one elastomer (A) in the presence of at least one curing system (CS) for the elastomer (A), so that dynamic curing occurs during melt mixing.

It is thus understood that the vulcanizate (V) may thus additional comprise residues or decompositions products derived from said curing system, without this deviating from above detailed description.

The curing system (CS) can be effective for ionic curing, both based on polyhydroxylated or polyaminic compounds, peroxide curing and/or mixed curing of the elastomer (A).

The amount of the curing system (CS) is not particularly limited, provided that is present in an amount effective to ensure crosslinking of the elastomer (A) within the vulcanizate (V).

A curing system for peroxide curing generally comprises at least one peroxide (generally, an organic peroxide) that is capable of generating radicals by thermal decomposition, in an amount generally of between 0.1 and 10 and preferably between 0.5 and 5 weight parts per hundred parts of the elastomer (A). Among most commonly used agents, mention can be made of: dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl] carbonate.

Further, in addition, the curing system for peroxide curing comprises:

(a) at least one curing coagent, in an amount generally of between in an amount generally of between 0.5 and 10 and preferably between 1 and 7 weight parts per hundred parts of the elastomer (A); among these coagents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane; bis-olefins (OF), as above detailed; triazines, such as notably those described in European patent applications EP 860436 A (AUSIMONT SPA) Aug. 26, 1998 and WO 97/05122 (DUPONT DE NEMOURS) Feb. 13, 1997; among above mentioned curing coagents, bis-olefins (OF), as above detailed, and more specifically those of formula (OF-1), as above detailed, have been found to provide particularly good results;

(b) optionally, a metallic compound, in amounts of advantageously 1 to 15 and preferably 2 to 10 weight parts per hundred parts of the elastomer (A), selected from the group consisting of oxides and hydroxides of divalent metals, for instance Mg, Zn, Ca or Pb, optionally combined with a salt of a weak acid, for instance Ba, Na, K, Pb, Ca stearates, benzoates, carbonates, oxalates or phosphites;

(c) optionally, acid acceptors of the metal non-oxide type, such as 1,8-bis(dimethylamino)naphthalene, octadecylamine, etc.

When the vulcanizate (V) is obtained by peroxide curing, elastomer (A) preferably contains iodine and/or bromine atoms in the chain and/or at the end of the macromolecules. The introduction of these iodine and/or bromine atoms may be obtained:

by addition during elastomer (A) manufacture to the polymerization medium of brominated and/or iodinated cure-site comonomers, such as bromo and/or iodo olefins containing from 2 to 10 carbon atoms, or iodo and/or bromo fluoroalkyl vinyl ethers, in amounts such that the content of cure-site comonomers in the elastomer (A) is generally between 0.05 and 2 mol per 100 mol of the other base monomer units; or via addition during elastomer (A) manufacture of iodinated and/or brominated chain-transfer agent(s) to the polymerization medium, for instance compounds of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \le x+y \le 2$ or alkali metal or alkaline-earth metal iodides and/or bromides.

A curing system for ionic curing generally comprises at least one curing agent and at least one accelerator, as well known in the art.

The amount of accelerator(s) is generally comprised between 0.05 and 5 weight parts per hundred parts of elastomer (A) (phr) and that of the curing agent typically between 0.5 and 15 phr and preferably between 1 and 6 phr.

Aromatic or aliphatic polyhydroxylated compounds, or derivatives thereof, may be used as curing agents. Among these, mention will be made in particular of dihydroxy, trihydroxy and tetrahydroxy benzenes, naphthalenes or anthracenes; bisphenols, in which the two aromatic rings are linked together via an aliphatic, cycloaliphatic or aromatic divalent radical, or alternatively via an oxygen or sulphur atom, or else a carbonyl group. The aromatic rings may be substituted with one or more chlorine, fluorine or bromine atoms, or with carbonyl, alkyl or acyl groups. Bisphenol AF is particularly preferred.

Examples of accelerators that may be used include: quaternary ammonium or phosphonium salts; aminophosphonium salts; phosphoranes; the imine compounds; etc. Quaternary phosphonium salts and aminophosphonium salts are preferred.

Instead of using the accelerator and the curing agent separately, it is also possible for the curing system for ionic curing to comprise an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethylphosphoranamine and tetrabutylphosphonium; particularly preferred anions are bisphenol compounds in which the two aromatic rings are bonded via a divalent radical chosen from perfluoroalkyl groups of 3 to 7 carbon atoms, and the OH groups are in the para position.

Other ingredients optionally comprised in the curing system for ionic curing are:
i) one or more mineral acid acceptors, generally chosen from those known in the ionic curing of elastomers, preferably selected from the group consisting of oxides of divalent metals, preferably oxides of Mg, Zn, Ca or Pb, typically comprised in amounts of 1-40 phr of elastomer (A);
ii) one or more basic compounds chosen from those known in the ionic curing of elastomers, commonly selected from the group consisting of hydroxides of divalent metals (preferably: $Ca(OH)_2$, $Sr(OH)_2$, $Ba(OH)_2$), metal salts of weak acids, for instance Ca, Sr, Ba, Na and K carbonates, benzoates, oxalates and phosphites and mixtures of the above mentioned hydroxides with the above mentioned metal salts, typically added in amounts of from 0.5 to 10 phr of elastomer (A).

In one embodiment of the present invention, the process for preparing the vulcanizate (V) comprises mixing elastomer (A), at least one curing system (CS) and polymer (F) in a mixer at a temperature where all the organic components are in the molten form, thus at a temperature above the glass transition temperature or above the melting temperature of all the organic components. The elastomer (A) is dynamically cured during melt mixing to obtain a vulcanizate (V) that is then cooled, removed from the mixer and suitably shaped into a granular form.

In another embodiment of the present invention, the process for preparing the vulcanizate (V) is a two-steps process comprising: (i) a first step wherein the curing system (CS) is mixed with the elastomer (A) in a melt mixer at a temperature where elastomer (A) is in the molten form, to provide a masterbatch that is then cooled and cut in pieces; and (ii) a second step wherein the masterbatch obtained in step (i) is melt mixed with the polymer (F) at a temperature where all the components are in the molten form, thus at a temperature above the glass transition temperature or above the melting temperature of all the components in conditions wherein the elastomer (A) is dynamically cured to obtain a vulcanizate (V); the vulcanizate (V) thus obtained is then cooled, removed from the mixer and suitably shaped into a granular form.

Mixing in the molten state can be effected using standard mixing devices; it is generally accomplished using extruder devices, with twin-screw extruders being preferred. It is hence common practice of manufacturing the composition (C) or the vulcanizate (V) in the form of pellets.

The composition (C) or the vulcanizate (V), pure or compounded with other additional optional ingredients, e.g. extender oils, synthetic processing oils, stabilizers, processing aids, fillers, pigments, adhesives, tackifiers, and waxes, can be used to make films, tubes, strips or filaments, as well as the composition (C) or the vulcanizate (V) can be appropriately shaped into different articles.

In particular, the present invention pertains to a composition (C) or a vulcanizate (V) in the form of a film. The film can be used as stand-alone item, or as a part of a multilayer structure, e.g as flat film or wrapped around a tubular article.

In particular, the present invention pertains to a pipe comprising at least one composition (C) or the vulcanizate (V) of the invention.

By the term "pipe", it is hereby intended to denote a continuous tubular pipe consisting of, or at least comprising, at least one composition (C) or the vulcanizate (V) as defined above or a continuous tubular pipe whose inner or outer surface is coated with a tubular layer consisting of, or at least comprising, at least one composition (C) or the vulcanizate (V) as defined above.

The pipe of the present invention may be a monolayer pipe or a multilayer pipe.

By the term "monolayer pipe", it is hereby intended to denote a pipe consisting of one tubular layer consisting of, or at least comprising, at least one composition (C) or the vulcanizate (V).

By the term "multilayer pipe", it is hereby intended to denote a pipe comprising at least two concentric layers adjacent to each other, wherein at least the inner layer comprises, or preferably consists of, at least one composition (C) or the vulcanizate (V).

The composition (C) or the vulcanizate (V) of the invention may be advantageously processed into an article such as a pipe or a part thereof by melt-processing techniques such as extrusion or injection moulding.

The composition (C) or the vulcanizate (V) of the invention may be advantageously processed by melt-processing techniques at a temperature of at least 200° C., preferably of at least 250° C.

In another object, the present invention pertains to use of films or of articles comprising the composition (C) or the vulcanizate (V) in various applications such as oil and gas applications and automotive applications.

According to an embodiment of the present invention, the pipe of the invention may be a line in the fuel system for automotive elements.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit scope of the invention.

EXAMPLES

Raw Materials

Fluoroelastomer 1 contains 100 parts by weight of a vinylidene fluoride/hexafluoropropylene/tetrafluorethylene terpolymer having 68.5% fluorine content, 2.5 parts by weight of Bisphenol AF (CAS-No 1478-61-1), 0.5 part of Benzyl(diethylamino) diphenylphosphonium chloride (CAS-No 82857-68-9) and 0.4 parts by weight of benzyl-triphenylphosphonium chloride (CAS-No. 1100-88-5) (FKM1), herein after).

Fluoroelastomer 2 contains 100 parts by weight of a vinylidene fluoride/hexafluoropropoylene copolymer having 66% fluorine content, 2 parts by weight of Bisphenol AF (CAS-No 1478-61-1) and 0.4 parts by weight of Benzyl (diethylamino) diphenylphosphonium chloride (CAS-No 82857-68-9) (FKM2), herein after).

Fluoroelastomer 3, made of a vinylidene fluoride/hexafluoropropoylene copolymer having 66% fluorine content (FKM3, herein after).

Polymer (F-1): TFE (67% mol)-VDF (31% mol)-PPVE (2% mol) terpolymer having having melting point $T_m$=225° C. and MFI=22 g/10', prepared according to the procedure described in WO 2018/189091.

Polymer (F-2): TFE (66% mol)-VDF (32% mol)-PPVE (2% mol) terpolymer having having melting point $T_m$=225° C. and MFI=6 g/10', prepared according to the procedure described in WO 2018/189091.

Polymer (F-3-C): TFE (63% mol)-VDF(37% mol) copolymer having having melting point $T_m$=230° C. and MFI=5 g/10' prepared according to the procedure described in WO 2018/189091.

SOLEF® 1008 is a standard homopolymer of VDF with low-medium viscosity and Tm=172° C., commercially available from Solvay Specialty Polymers (polymer (F-4-C), herein after).

$Ca(OH)_2$, commercially available as Rhenofit®-CF from Rhein Chemie.

MgO, commercially available as Maglite-DE® from Hallstar.

Measurement of the Polymer Composition

The molar amount of the monomers in the polymers (F-1 F-2 and F-3-C) was measured through deconvolution of the NMR spectra obtained by solid-state $^{19}F$ Magic Angle Spinning (MAS) NMR using an Agilent DirectDrive2 400 MHz NB spectrometer operating at 376.62 MHz.

Measurement of the Second Melting Temperature

The melting point was determined by differential scanning calorimetry (DSC) according to ASTM D 3418 standard method. The second melting temperature, defined as the endothermic peak observed during the second heating period, was recorded and is hereby referred to as the melting point ($T_m$) of the polymer.

Measurement of the Melt Flow Index (MFI)

The melt flow index was measured according to ASTM D 1238 standard method by applying a weight of 5 Kg at 300° C.

Tensile Measurement (Elastic Modulus)

Tensile measurements were carried out at 23° C. according to ASTM D638 specimen type V on 1.5 mm thick films obtained by compression moulding of the polymers at 280° C.

Permeability Measurement

The permeability to Fuel CM15 (42.5% toluene, 42.5% iso-octane, 15 5 methanol) has been measured at 60° C. following ASTM E96 (weighing-cup method) on 0.3 mm thick films obtained by compression moulding of the polymers at 280° C.

The permeability coefficient has been calculated by the slope of weight loss versus time in the steady-state regime.

Examples 1 and 3

70 grams of a thermoplastic vulcanizate was prepared in two steps using a Brabender internal mixer EHT 50 equipped with universal (W) blades.

The first step consisted in the preparation of an elastomer masterbatch (MB1) by adding 3 phr of calcium hydroxide and 3 phr of magnesium oxide to 100 g of FKM1. The MB1 was prepared using elastomer blades, cooling the mixer to keep the temperature always below 70° C. The mixing time was twenty minutes. The MB1 was removed from the mixer and cut in small pieces of 10-15 mm for subsequent use.

In the second step, the internal mixer temperature was set at 280° C. The required quantity of polymer (F-1) was poured into the mixer and melted for 5 minutes at 30 rpm. The temperature was decreased to 260° C. After 5 minutes, the required quantity of MB1 prepared in the first step was added. The mixing was continued for 10 more minutes at 30 rpm, recording the torque and the temperature.

Finally, the vulcanizate thus obtained was manually removed from the mixer and grinded in liquid nitrogen.

70 grams of each vulcanizate were prepared by this procedure.

Composition, elastic modulus and permeability of the vulcanizates obtained in Examples 1 and 3 are reported Table 2.

Examples 2 and 4

In a first step, a powder mix made of polymer (F-2) and 3 phr each of Calcium Hydroxide and Magnesium Oxide was overnight prepared in a roller mixer.

Then, 70 grams of a thermoplastic vulcanizate were prepared using a Brabender internal mixer EHT 50, equipped with universal (W) blades. The internal mixer temperature was set at 280° C. The needed quantity of powder mix was poured into the mixer and melted for 5 minutes at 30 rpm. Then the temperature was decreased to 260° C. After 5 minutes, the required quantity of FKM1 or FKM 2, cut in small pieces of 10-15 mm, was added and mixed at 30 rpm for 15 minutes, recording the torque and the temperature. Finally, the vulcanizate was manually removed from the mixer and grinded in liquid nitrogen.

70 grams of each vulcanizate were prepared by using this procedure.

Composition, elastic modulus and permeability of the vulcanizates obtained in Examples 2 and 4 are reported Table 2.

Example 5

70 grams of a composition was prepared in two steps using a Brabender internal mixer EHT 50 equipped with universal (W) blades.

The first step consisted in the preparation of an elastomer masterbatch (MB2) by adding 3 phr of magnesium oxide to 100 g of FKM3. The MB2 was prepared using elastomer blades, cooling the mixer to keep the temperature always below 70° C. The mixing time was twenty minutes. The MB2 was removed from the mixer and cut in small pieces of 10-15 mm for subsequent use.

In the second step, the internal mixer temperature was set at 280° C. The required quantity of polymer (F-1) was poured into the mixer and melted for 5 minutes at 30 rpm. The temperature was decreased to 260° C. After 5 minutes, the required quantity of MB2 prepared in the first step was added. The mixing was continued for 10 more minutes at 30 rpm, recording the torque and the temperature.

Finally, the compound thus obtained was manually removed from the mixer and grinded in liquid nitrogen.

Composition, elastic modulus and permeability of the compound obtained in Example 5 are reported Table 2.

Comparative Examples 1, 2 and 3

A thermoplastic vulcanizate was prepared in two steps using a Brabender internal mixer EHT 50 equipped with universal (W) blades.

The first step consisted in the preparation of an elastomer masterbatch (MB3) by adding 6 phr of calcium hydroxide and 3 phr of magnesium oxide to 100 g of FKM1. The MB3 was prepared using elastomer blades, cooling the mixer to keep the temperature always below 70° C. The mixing time was twenty minutes. The MB3 was removed from the mixer and cut in small pieces of 10-15 mm for subsequent use.

In the second step, the internal mixer temperature was set at 230° C. The required quantity of polymer (F-4-C) was poured into the mixer and melted for 5 minutes at 30 rpm. After 5 minutes, the required quantity of MB3 prepared in the first step was added. The mixing was continued for 10 more minutes at 30 rpm, recording the torque and the temperature.

Finally, the vulcanizate thus obtained was manually removed from the mixer and grinded in liquid nitrogen.

Composition, elastic modulus and permeability of the vulcanizates obtained in Comparative Examples 1, 2 and 3 are reported Table 2.

Comparative Example 4

A thermoplastic vulcanizate was prepared in two steps using a Brabender internal mixer EHT 50 equipped with universal (W) blades.

The first step consisted in the preparation of an elastomer masterbatch (MB3) by adding 6 phr of calcium hydroxide and 3 phr of magnesium oxide to 100 g of FKM1. The MB3 was prepared using elastomer blades, cooling the mixer to keep the temperature always below 70° C. The mixing time was twenty minutes. The MB3 was removed from the mixer and cut in small pieces of 10-15 mm for subsequent use.

In the second step, the internal mixer temperature was set at 280° C. The required quantity of Polymer (F-3-C) was poured into the mixer and melted for 5 minutes at 30 rpm. The temperature was decreased to 260° C. After 5 minutes, the required quantity of MB3 prepared in the first step was added. The mixing was continued for 10 more minutes at 30 rpm, recording the torque and the temperature.

Finally, the vulcanizate thus obtained was manually removed from the mixer and grinded in liquid nitrogen.

Composition and elastic modulus of the vulcanizate obtained in Comparative Example 4 are reported Table 2.

TABLE 2

| | Polymer (F) | Elastomer (A) | FKM % by weight in composition | E (MPa) | Permeability M15 60° C. |
|---|---|---|---|---|---|
| Ex. 1 | (F-1) | FKM1 | 20 | 324 | 22 |
| Ex. 2 | (F-2) | FKM1 | 30 | 183 | 35 |
| Ex. 3 | (F-1) | FKM1 | 40 | 140 | 53 |
| Ex. 4 | (F-2) | FKM2 | 30 | 185 | 42 |
| Ex. 5 | (F-1) | FKM3 | 30 | 176 | 26 |
| C. Ex. 1 | (F-4-C) | FKM1 | 30 | 950 | 21 |
| C. Ex. 2 | (F-4-C) | FKM1 | 40 | 700 | 39 |
| C. Ex. 3 | (F-4-C) | FKM1 | 50 | 500 | 50 |
| C. Ex. 4 | (F-3-C) | FKM1 | 30 | 520 | 32 |

In view of the above, it has been found that the compositions of the present invention as notably represented by the compounds of examples 1 to 5, while showing a low permeability to fuel, which is comparable to that of compositions of the prior art including PVDF homopolymer or TFENDF copolymers as thermoplastic phase, surprisingly exhibit lower elastic modulus. The compositions of the present invention are thus particularly suitable for applications wherein low permeability and high flexibility are required, such as in oil and gas applications and in automotive fuel lines.

The invention claimed is:

1. A thermoplastic elastomer composition [composition (C)] comprising a continuous thermoplastic fluoropolymer phase and a dispersed fluoroelastomer phase, said composition comprising:
   a. at least one thermoplastic fluoropolymer [polymer (F)], said polymer (F) comprising:
      from 60% to 67% by moles of recurring units derived from tetrafluoroethylene (TFE),
      from 31% to 35% by moles of recurring units derived from vinylidene fluoride (VDF), and
      from 1.5% to 3.5% by moles of recurring units derived from at least one perfluoroalkylvinylether (PAVE) of formula (I):

$$CF_2=CF-O-Rf \qquad (I)$$

wherein Rf is a $C_1$-$C_6$ alkyl group or a $C_1$-$C_6$ (per)fluoroalkyl group,
      wherein the molar amounts of said recurring units are relative to the total moles of recurring units in said polymer (F); and
   b. at least one (per)fluoroelastomer [elastomer (A)],
   wherein:
   the elastomer (A) is present in an amount of from 20 to 40% by weight of the composition (C),
   the weight ratio of the polymer (F) to the elastomer (A) is between 10/90 wt/wt to 70/30 wt/wt,
   the elastomer (A) is selected from the group consisting of vinylidene fluoride/hexafluoropropylene copolymers and vinylidene fluoride/hexafluoropropylene/tetrafluoroethylene copolymers,
   the composition (C) has an elastic modulus of from 140 MPa to 324 MPa as determined by ASTM D638 specimen type V on 1.5 mm thick films obtained by compression moulding of the polymers at 280° C., and
   the composition (C) has a permeability to fuel M15 at 60° C. of from 22 to 53 as determined according to ASTM E96 (weighing cup method) on 0.3 mm thick films obtained by compression moulding of the polymers at 280° C.

2. The composition (C) of claim 1, wherein the perfluoroalkylvinylether (PAVE) of formula (I) is selected from the group consisting of perfluoromethylvinylether (PMVE) of formula $CF_2=CF-O-CF_3$, perfluoroethylvinylether (PEVE) of formula $CF_2=CF-O-CF_2-CF_3$ and perfluoropropylvinylether (PPVE) of formula $CF_2=CF-O-CF_2-CF_2-CF_3$.

3. The composition (C) according to claim 1, which further contains at least one additional ingredient selected from the group consisting of extender oils, synthetic processing oils, stabilizers, at least one processing aid, fillers, pigments, adhesives, tackifiers, and waxes.

4. A process for manufacturing the composition (C) according to claim 1, said process comprising melt mixing the at least one polymer (F) and the at least one elastomer (A).

5. A thermoplastic elastomer vulcanizate composition [vulcanizate (V)], comprising the thermoplastic elastomer composition (C) according to claim 1.

6. A process for manufacturing the vulcanizate (V) according to claim 5, said process comprising melt mixing and dynamic curing the at least one polymer (F), and the at least one elastomer (A) in the presence of at least one curing system (CS) for the elastomer (A).

7. A The vulcanizate (V) according to claim 5 in the form of a film.

8. An article comprising the at least one composition (C) according to claim 1.

9. An article comprising the vulcanizate (V) according to claim 5.

10. The article according to claim 8 that is a pipe.

* * * * *